(12) United States Patent
Ahmad et al.

(10) Patent No.: US 7,581,225 B2
(45) Date of Patent: Aug. 25, 2009

(54) MULTITHREADING WITH CONCURRENCY DOMAINS

(75) Inventors: Arshad F. Ahmad, Bellevue, WA (US); Balasubramanian Shyamsundar, Redmond, WA (US); Brad M. Olenick, Redmond, WA (US); Clemens A. Szyperski, Redmond, WA (US); Simeon Cran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 50 days.

(21) Appl. No.: 11/360,454

(22) Filed: Feb. 23, 2006

(65) Prior Publication Data

US 2006/0248530 A1 Nov. 2, 2006

Related U.S. Application Data

(60) Provisional application No. 60/676,137, filed on Apr. 29, 2005, provisional application No. 60/703,220, filed on Jul. 28, 2005.

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/314; 719/313
(58) Field of Classification Search ......... 719/310–320, 719/328–330; 709/213
See application file for complete search history.

(56) References Cited

U.S. PATENT DOCUMENTS

| | | | |
|---|---|---|---|
| 5,659,701 A * | 8/1997 | Amit et al. ................. | 719/317 |
| 5,940,828 A | 8/1999 | Anaya et al. ................ | 707/8 |
| 6,083,276 A * | 7/2000 | Davidson et al. ............ | 717/107 |
| 6,205,465 B1 * | 3/2001 | Schoening et al. .......... | 718/102 |
| 6,256,780 B1 | 7/2001 | Williams et al. ............. | 717/5 |
| 6,339,775 B1 | 1/2002 | Zamanian et al. ........... | 707/101 |
| 6,670,969 B1 * | 12/2003 | Halstead et al. ............. | 715/762 |
| 6,721,951 B1 | 4/2004 | Williams et al. ............. | 719/329 |
| 6,820,135 B1 | 11/2004 | Dingman et al. ............ | 709/246 |
| 6,823,518 B1 | 11/2004 | Bliss et al. .................. | 719/310 |
| 7,032,210 B2 | 4/2006 | Alloing et al. ............... | 717/106 |
| 7,043,481 B2 | 5/2006 | Mullins et al. ............... | 707/10 |
| 7,233,982 B2 | 6/2007 | Shenefiel .................... | 709/219 |
| 7,280,996 B2 | 10/2007 | Hayakawa et al. ........... | 707/1 |
| 7,287,259 B2 | 10/2007 | Grier et al. .................. | 717/109 |
| 7,383,285 B1 | 6/2008 | Pal et al. ..................... | 707/104.1 |
| 2002/0065950 A1 | 5/2002 | Katz et al. ................... | 709/318 |
| 2002/0069401 A1 | 6/2002 | Wall et al. ................... | 717/109 |
| 2003/0135825 A1 | 7/2003 | Gertner et al. ............... | 715/513 |

(Continued)

OTHER PUBLICATIONS

International Search Report dated Apr. 26, 2007 cited in International Application No. PCT/US 06/15184.

(Continued)

*Primary Examiner*—Diem Ky Cao
(74) *Attorney, Agent, or Firm*—Merchant & Gould

(57) ABSTRACT

Methods, systems and computer products are provided for partitioning software application components into separate domains called concurrency domains. Computationally expensive, slow or long-running methods may be deployed into such domains, thus keeping the associated application more responsive to the end user. According to one aspect of the invention, a given concurrency domain is a partition of runtime objects for providing synchronization and thread isolation within the partition and for providing concurrency with other such partitions in a data-driven dynamically composed and reconfigured application.

20 Claims, 8 Drawing Sheets

U.S. PATENT DOCUMENTS

| | | | |
|---|---|---|---|
| 2003/0192031 A1 | 10/2003 | Srinivasan et al. | 717/120 |
| 2004/0031018 A1* | 2/2004 | Marty | 717/120 |
| 2004/0083238 A1 | 4/2004 | Louis et al. | 707/200 |
| 2004/0083455 A1* | 4/2004 | Gschwind et al. | 717/120 |
| 2004/0181779 A1* | 9/2004 | Gorti | 717/120 |
| 2004/0230666 A1 | 11/2004 | Taboada et al. | 709/217 |
| 2005/0044235 A1 | 2/2005 | Balahura et al. | 709/227 |
| 2005/0120275 A1 | 6/2005 | Fletcher et al. | 714/38 |
| 2005/0135383 A1 | 6/2005 | Shenefiel | 370/395.52 |
| 2006/0245096 A1 | 11/2006 | Ahmad et al. | |
| 2006/0248104 A1 | 11/2006 | Ahmad et al. | |
| 2006/0248112 A1 | 11/2006 | Williams et al. | |
| 2006/0248448 A1 | 11/2006 | Williams et al. | |
| 2006/0248449 A1 | 11/2006 | Williams et al. | |
| 2006/0248450 A1 | 11/2006 | Wittenberg et al. | |
| 2006/0248451 A1 | 11/2006 | Szyperski et al. | |
| 2006/0277201 A1 | 12/2006 | Dorsett | 707/10 |
| 2008/0046885 A1* | 2/2008 | Shultz et al. | 718/1 |
| 2008/0263549 A1 | 10/2008 | Walker | 718/100 |

OTHER PUBLICATIONS

U.S. Office Action dated Feb. 4, 2008 cited in U.S. Appl. No. 11/360,456.

U.S. Office Action dated Mar. 27, 2008 cited in U.S. Appl. No. 11/360,454.

Chamberlain et al., "Quilt: An XML Query Language for Heterogeneous Data Sources," 2001, Springer Verlag Berlin Heidelberg, pp. 1-25.

U.S. Office Action dated Jun. 23, 2008 cited in U.S. Appl. No. 11/360,856.

U.S. Final Office Action dated Nov. 7, 2008 cited in U.S. Appl. No. 11/360,456.

Chinese Office Action dated Oct. 10, 2008 in Application No. 200680014637.X.

U.S. Office Action dated May 22, 2009 cited in U.S. Appl. No. 11/360,456.

* cited by examiner

MULTITHREADING WITH CONCURRENCY DOMAINS

CROSS-REFERENCE TO RELATED APPLICATIONS

This patent application claims priority to U.S. Patent Application Ser. No. 60/676,137 filed Apr. 29, 2005 and entitled "Application Description Language," and U.S. Patent Application Ser. No. 60/703,220 filed Jul. 28, 2005 and entitled "Markup Language Based Application Framework with Application Description Language, Concurrency Domains, Application Framework Phasing Models, and Application Framework Transaction Transforms", the disclosures of which are expressly incorporated herein, in their entirety, by reference.

This patent application is also related to and filed concurrently with U.S. patent application Ser. No. 11/360,455, entitled "Application Framework Phasing Model," U.S. patent application Ser. No. 11/360,457, entitled "XML Application Framework," U.S. patent application Ser. No. 11/360,856, entitled "Application Description Language," and U.S. patent application Ser. No. 11/360,456, entitled "Transaction Transforms,"; U.S. patent application Ser. No. 11/360,857, entitled "XML Application Framework", U.S. patent application Ser. No. 11/360,851, entitled "XML Application Framework", U.S. patent application Ser. No. 11/360,448, entitled "XML Application Framework", which are assigned to the same assignee as the present application and expressly incorporated herein, in their entirety, by reference.

BACKGROUND

With the advent of the computer age, computer and software users have grown accustomed to user-friendly software applications that help then write, calculate, organize, prepare presentations, send and receive electronic mail, make music, and the like. For example, modern electronic word processing applications allow users to prepare a variety of useful documents. Modern spreadsheet applications allow users to enter, manipulate, and organize data. Modern electronic slide presentation applications allow users to create a variety of slide presentations containing text, pictures, data or other useful objects.

Many such applications operate according to component frameworks where a number of application components run sequentially and/or concurrently for executing individual methods of a given overall application method. Typically, concurrent component methods require multi-threading of various methods. That is, an application that supports concurrent operations uses multiple method threads. A fundamental requirement of such an application is its ability to synchronize the multiple threads so that any data that is shared among the threads is consistent. An area of difficulty in software is reentrancy. A problem introduced often by synchronization methods is non-deterministic reentrancy. Generally, reentrancy occurs when a thread makes a nested call and thereby enters the same object a second time before completing the first call. For example, if a thread is executing a call to a first task of a first object and, as part of that execution, calls a task of a second object, then the thread enters the second object before completing and returning from the call to the first object. If part of the execution of the task of the second object includes calling a second task of the first object, then the thread reenters the first object before completing and returning from the original call to the first object.

Synchronization of application components and multithreading of application methods are complex problems. For example, it can be difficult to coordinate execution of various threads, especially when instructions in two threads need to use the same data or resources. An instruction on a first thread might change data that is needed by an instruction on a second thread. If that data is changed before the instruction on the second thread is executed, it can cause an error in the execution of the program. For conventional applications requiring component synchronization and multi-threading, a variety of prior threading models have been employed including Java-style synchronized methods and statements, common language runtime (CLR), synchronization contexts, apartment threading and rental threading. Use of such models requires inclusion of complex logic in an application's programming for properly handling multiple method threads. Using these models with a conventional application, concurrency must be designed into specific parts of the application and must be tested for correctness against deadlock and race conditions.

Such prior models do not work well, if at all, with dynamically composed application frameworks where an application is made up of a number of components that are dynamically generated or reconfigured based on data received by those components or by other related components of the application. This is problematic because such prior methods force multi-threaded systems to be compartmentalized into specific areas of the application. For such dynamically generated and reconfigured applications, it is necessary that application components be written without complex thread-handling logic, as associated with prior threading models.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention solve the above and other problems by providing for partitioning application components into separate domains called concurrency domains. Computationally expensive, slow or long-running methods may be deployed into such domains, thus keeping the associated application responsive to the end user. According to one aspect of the invention, a given concurrency domain is a partition of runtime objects for providing synchronization and thread isolation within the partition and for providing concurrency with other such partitions in a data-driven dynamically composed and reconfigured application.

According to aspects of the invention, at runtime, a given data-driven dynamically composed and reconfigured application comprises one or more concurrency domains. A first concurrency domain is the main concurrency domain. The main concurrency domain includes user interface components of the application and governs user interface creation during application startup. Additional concurrency domains included in the application are secondary concurrency domains. A secondary concurrency domain is created and operated by another concurrency domain that serves as its parent concurrency domain. Concurrency domains may be used anytime there is a need for concurrency in a given application with each concurrency domain performing tasks for the main application and publishing its results to another concurrency domain as required.

According to a particular aspect of the invention, methods, systems and computer products are provided for synchronizing operations of components of a software application. According to this aspect, a first concurrency domain is provided including a single internal processing thread operative to execute at least one single-threaded object of the software application. A first boundary object associated with the first concurrency domain is provided and is operative to receive a first work item from a software application object external to the first concurrency domain that is directed to the single-threaded object. The first boundary object is further operative to post the first work item to a work item queue. A first thread dispatcher object included in the concurrency domain is provided and is operative to retrieve the posted first work item from the work item queue and to pass the posted first work item to the single-threaded object for processing by the single-threaded object. The single-threaded object is operative to process the posted first work item and to return a result to the external object via the first boundary object.

These and other features and advantages, which characterize the present invention, will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
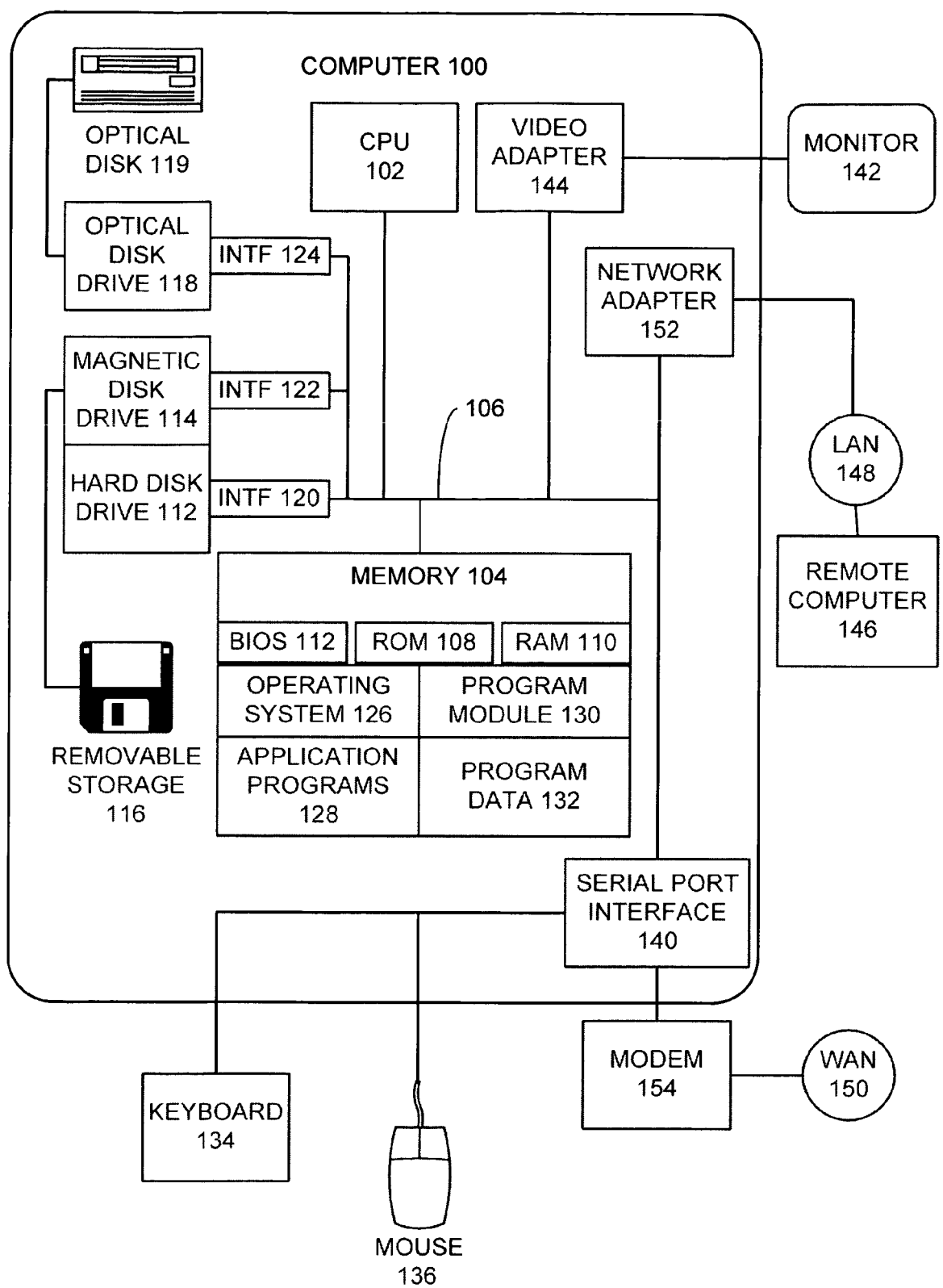
FIG. 1 illustrates a suitable computing environment in which the present invention may be implemented.

In the following detailed description, references are made to the accompanying drawings that form a part hereof, and in which are shown by way of illustrations specific embodiments or examples. Like reference numerals represent like components, entities and configurations throughout the several views. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

FIG. 1 illustrates a suitable computing environment for implementing concurrency domains. Although not required, an embodiment of the invention will be described in the general context of computer-executable instructions being executed by a personal computer. Generally, programmed operations perform particular tasks or implement particular abstract data types.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs). A number of program modules can be stored on the hard disk 112, magnetic disk 116, optical disk 119, ROM 108, or RAM 110, including an operating system 126, application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or tasks. These operations, steps, and tasks may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium.

Figure 2:
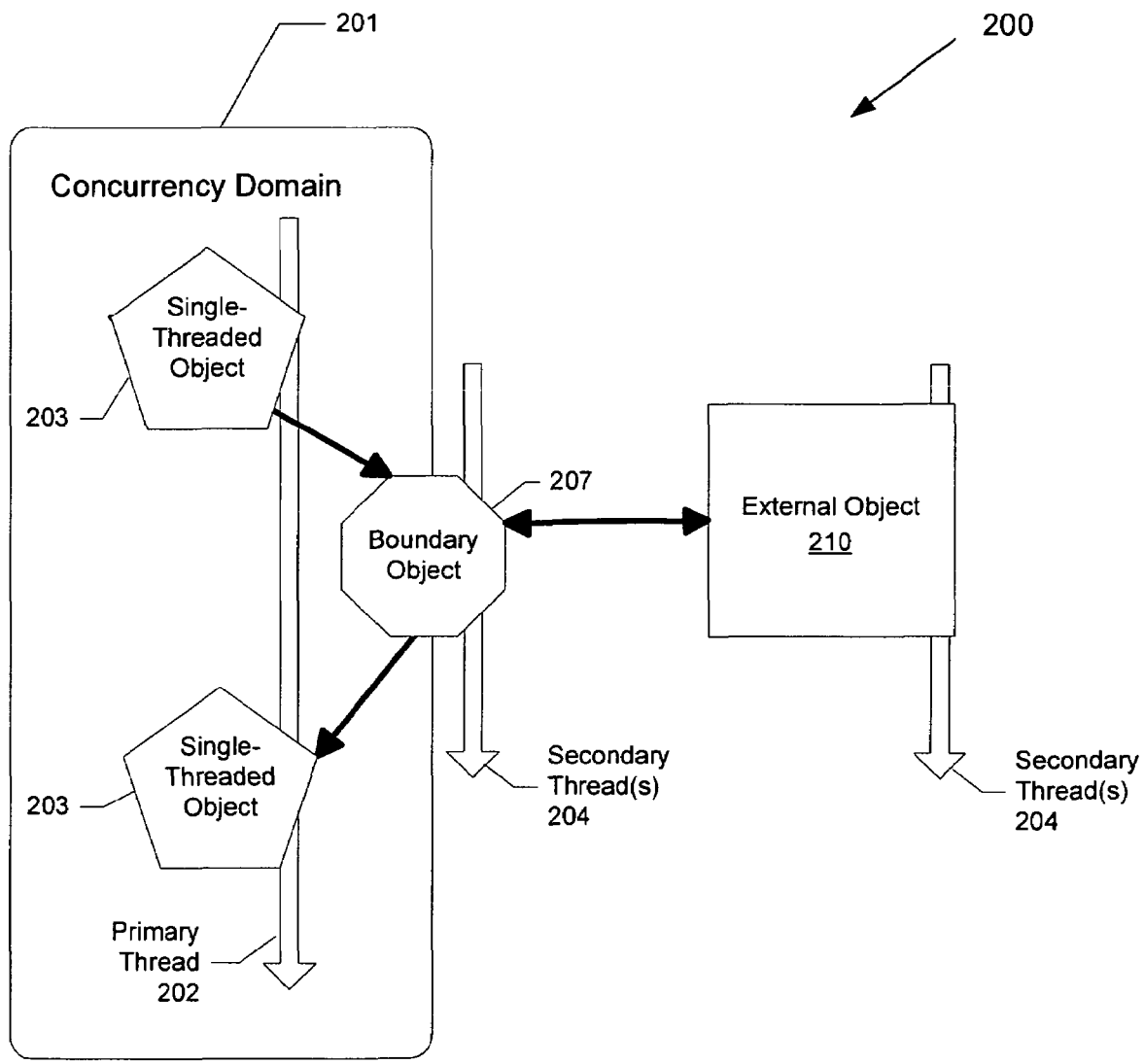
FIG. 2 illustrates an example system configured to concurrently execute multiple objects according to one embodiment of the present invention.

As briefly described above, embodiments of the present invention are directed to methods, systems and computer products for partitioning components of a software application into separate domains for providing synchronization and thread isolation within partitions of components and for providing for improved concurrent operations between partitions of components. FIG. 2 illustrates an example system configured to concurrently execute multiple objects according to one embodiment of the present invention. The example system 200 includes a concurrency domain 201, which is a collection (or partition) of one or more single-threaded objects 203 that all execute on a single thread 202 and which do not directly (e.g., or synchronously) communicate with external objects 210. The internal thread 202 executes the objects 203 according to logic imposed by the concurrency domain 201. The internal thread 202 executes only the single-threaded objects 203 within the concurrency domain 201. The internal thread 202 does not execute any external objects 210.

According to one embodiment, the same thread need not be used as the internal thread 202 throughout the life of the concurrency domain 201. Rather, when no objects need to execute on the internal thread 202, the thread serving as the internal thread 202 may return to a thread pool (not shown). When a thread is once again needed, a new thread may be pulled from the thread pool to act as the internal thread 202. According to another embodiment, one of the single-threaded objects 203 has thread affinity, meaning that the single-threaded object 203 needs to execute on the same thread. In this embodiment, the same thread serves as the internal thread 202 throughout the life of the concurrency domain 201. According to one embodiment, secondary threads 204, discussed in more detail herein, are also allocated from the thread pool.

Referring still to FIG. 2, the system 200 further includes at least one secondary thread 204 and at least one external object 210. Embodiments of external objects 210 include any object executing on one or more secondary threads 204. Secondary threads 204 include any thread other than the internal thread 202 executing in the associated application. As described above, the example concurrency domain 201 illustrated in FIG. 2 includes an internal thread 202 and multiple single-threaded objects 203. These single-threaded objects 203 are executed using only the internal thread 202.

The objects 203 within a concurrency domain 201 are isolated from the rest of the secondary threads 204 and external objects 210 in the program. Secondary threads 204 do not execute any single-threaded object 203 included within the concurrency domain 201. Each external object 210 is configured for execution on one or more of the secondary threads 204. External objects 210 asynchronously communicate with the single-threaded objects 203 within a concurrency domain 201. Communication includes the passing of data between objects or the invocation of one object's methods (e.g., or tasks) by another object.

Asynchronous communication across concurrency domain 201 boundaries is achieved through the use of boundary objects 207. Each concurrency domain 201 is associated with one or more boundary objects 207. These boundary objects 207 can be viewed as a membrane or gated wall enclosing the concurrency domain 201. Examples of boundary objects 207 include data connectors and objects that implement custom protocols between concurrency domains 201 or between a concurrency domain 201 and an external object 210.

Single-threaded objects 203 within the concurrency domain 201 use one or more boundary objects 207 to asynchronously communicate with the external objects 210. The single-threaded objects 203 communicate with the boundary object 207 using the internal thread 202. The boundary object 207 then communicates with the external object 210 using one or more secondary threads 204. The boundary object 207 thereby passes information and invocations across the boundaries of the concurrency domain 201. According to another embodiment, one boundary object 207 communicates with another boundary object 207 using the secondary thread 204 before passing information to the external object 210.

The boundary object 207 acts as an interface between the internal thread 202 of the concurrency domain 201 and each of the secondary threads 204. According to one embodiment, the boundary object 207 receives an inbound communication from an external object 210 using a secondary thread 204 and filters the communication to the appropriate internal objects 203. The filtering method will be described in more detail herein. According to another embodiment, the boundary object 207 receives an outbound communication from an internal object 203 using the internal thread 202 and transmits the communication to the appropriate external objects 210 using a secondary thread 204. According to one embodiment, boundary objects may call out to external objects on an internal thread, but the boundary objects doing so are under constraints. That is, allowing boundary objects to call out to external objects must not cause unbounded delays or deadlocks by doing so. Another constraint prevents external objects from holding references to internal objects that prevents direct reentrancy of the concurrency domain under the control of external objects.

Synchronous communication occurs when the thread on which a first object is executing enters a second object to execute a method of the second object. External objects 210 do not synchronously communicate with the single-threaded objects 203 within the concurrency domain 201. Accordingly, a secondary thread executing an external object 210 does not directly call into or enter a single-threaded object 203 within the concurrency domain 201.

Figure 3:
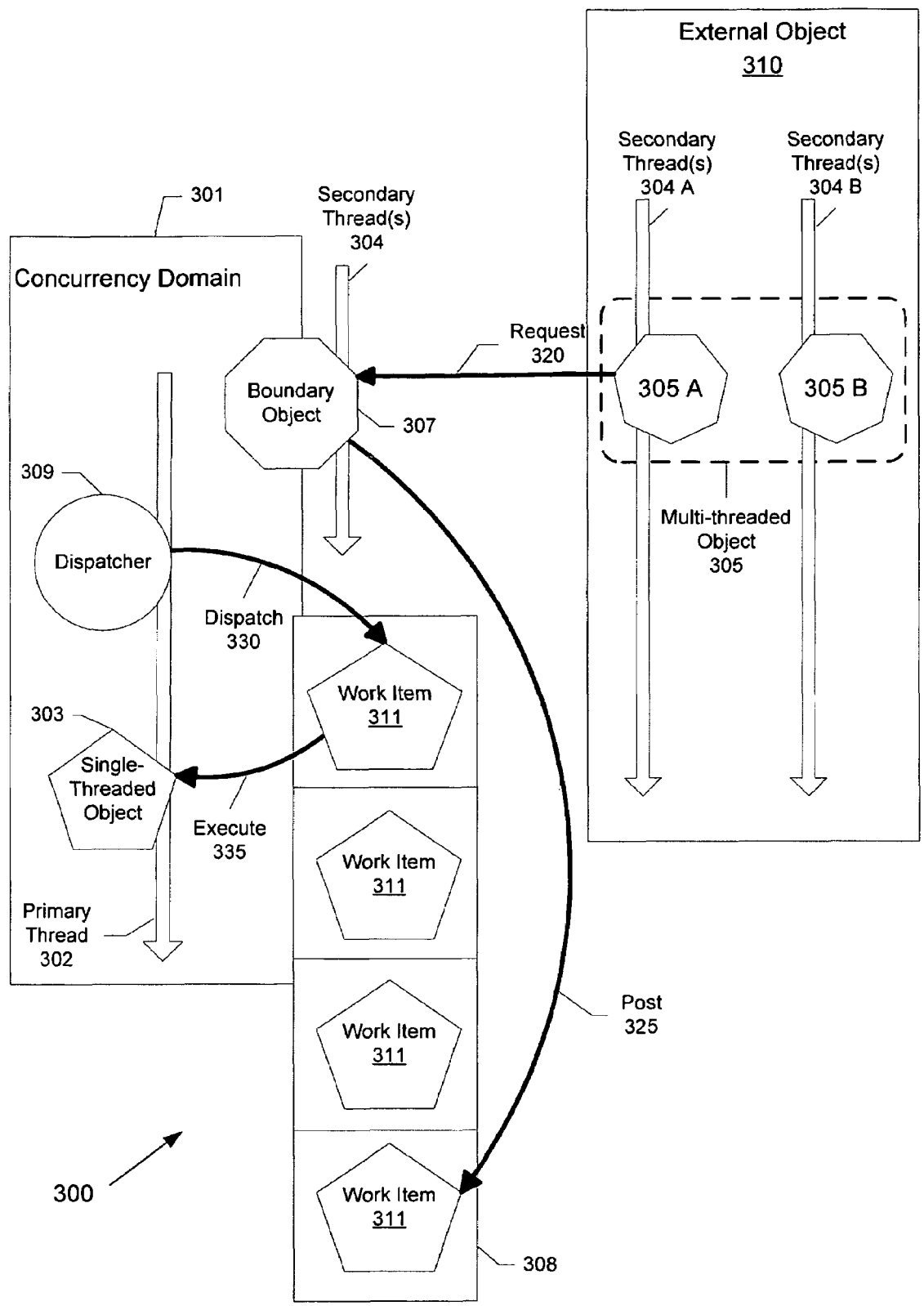
FIG. 3 illustrates another example system configured to concurrently execute multiple objects according to one embodiment of the present invention.

FIG. 3 illustrates another example system 300 in which a concurrency domain 301 interfaces with an external object 310. One example of asynchronous communication is illustrated between an external object 310 and an internal object 303. The concurrency domain 301 includes a internal thread 302, a single-threaded object 303 configured for execution on the internal thread 302, and a boundary object 307 for communicating with the external object 310. Another embodiment of this system 300 includes multiple boundary objects 307 and multiple single-threaded objects 303.

According to one embodiment, the external object 310 includes a multithreaded object 305 configured for execution on two or more secondary threads 304. One portion 305A of the multithreaded object 305 is shown executing on one secondary thread 304A and another portion 305B of the multithreaded object 305 is shown executing on another secondary thread 304B. According to another embodiment, the external object 310 includes a plurality of multithreaded objects 305 or a single-threaded object (not shown) configured for execution on one secondary thread 304.

The concurrency domain 301 in the system 300 maintains a work queue 308. The work queue 308 is a multi-element data structure on which tasks (e.g., invocations of methods of internal, single-threaded objects 303, data updates, and other executable methods) are posted (e.g., inserted) and from which tasks are removed. According to one embodiment, tasks are removed from the work queue 308 only in the same order in which they were posted; that is, according to a first in, first out constraint. According to another embodiment, tasks posted to the work queue 308 are assigned a priority and each task is removed according to its priority.

Incoming communications are posted to the work queue 308 by the boundary object 307. These posted communications form work items 311, which are requests (e.g., invocations or calls) for the execution of tasks of an internal, single-threaded object 303 or a boundary object 307 associated with the concurrency domain 301. The request that forms the work item 311 can be communicated to the boundary object 307 by an external object 310 or by another boundary object 307. For example, in FIG. 3, the multithreaded object 305 of the external object 310 requests the boundary object 307 to perform a task as depicted by arrow 320. The boundary object 307 then posts a work item 311, including the task, to the end of the work queue 308 as depicted by arrow 325. According to another embodiment, multiple boundary objects 307 are associated with the concurrency domain 301 and one or more of these boundary objects 307 may post work items 311 to the work queue 308. According to yet another embodiment, an internal, single-threaded object 303 requests a boundary object 307 to post a work item 311 to the work queue 308 to defer execution of a task to a later time.

According to one embodiment, to conserve resources when preparing to post a new task to the work queue 308, the boundary object 307 checks the work queue 308 and determines whether any of the queued work items 311 include related tasks. If there are related tasks, the boundary object 307 can selectively bundle the new task with a previously queued related task as a subtask rather than posting the new task as an entirely new work item 311.

Referring still to FIG. 3, according to one embodiment, the concurrency domain 301 includes a dispatcher 309 for dispatching work items 311 from the work queue 308 to a single-threaded object 303 for processing. The dispatcher 309 uses the internal thread 302 to remove work items 311 from the work queue 308 and dispatches each work item 311 for execution on the internal thread 302. The dispatcher 309 invokes the task included in the work item 311. For example, in FIG. 3, the dispatcher 309 dispatches a work item 311 from the work queue 308 as depicted by arrow 330. The work item 311 then executes on the internal thread 302 as depicted by arrow 335.

According to one embodiment, posting a work item 311 to the work queue 308 does not force the dispatcher 309 to act. Rather, execution of work items 311 is deferred to a point in time dictated by a top-level cycle logic of the concurrency domain 301. Once the work item 311 is posted to the work queue 308, the internal thread 302 executes the requested task in the next appropriate cycle of the concurrency domain 301 as determined by the dispatcher 309. Accordingly, external objects 310 do not determine when a work item 311 is removed and hence when a task of an internal, single-threaded object 303 is invoked and executed. External objects 310 also do not determine when boundary objects 307 execute tasks on the internal thread 302 of the concurrency domain 301.

Once a task is dispatched and completed, the out-bound result is passed to the boundary object 307 as a callback. The boundary object 307 then communicates the callback to the external object 310 that originally posted the work item 311 that invoked the task that achieved the result. Examples of callbacks include data, flags indicating the task is complete, method calls, and the like.

Figure 4:
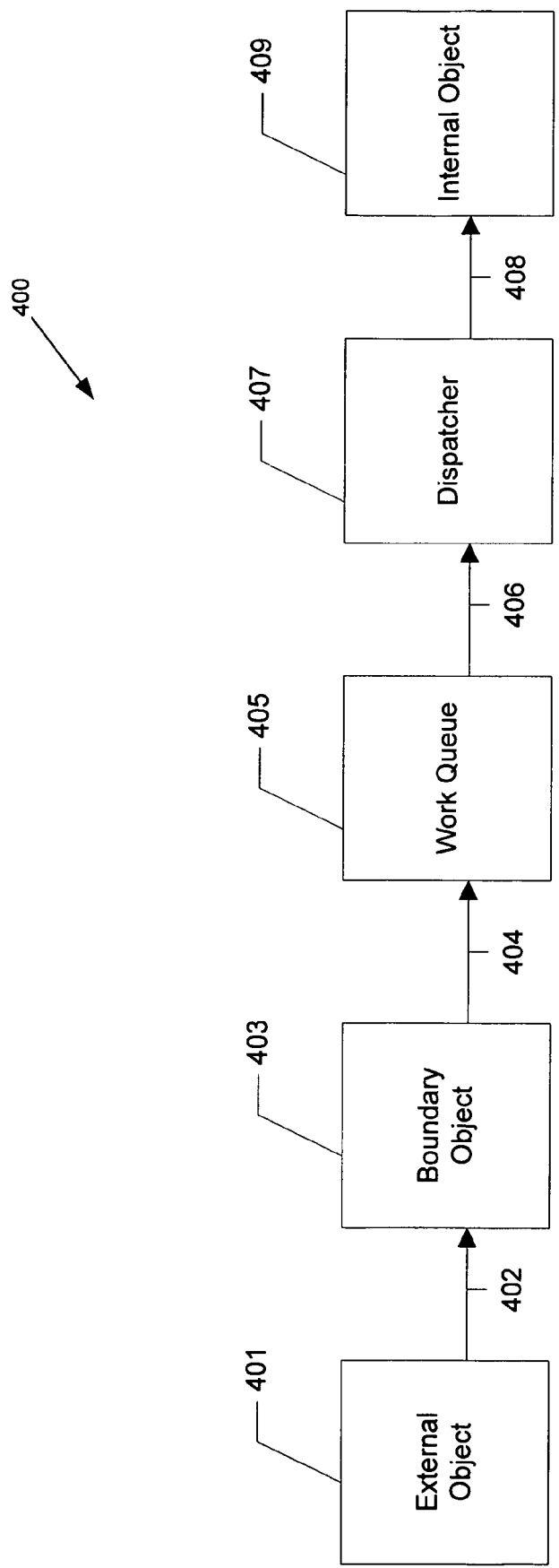
FIG. 4 depicts asynchronous communication between an internal, single-threaded object and an external object.

FIG. 4 depicts asynchronous communication between an internal, single-threaded object and an external object. According to an embodiment of the invention, a chain of communication 400 occurring during asynchronous communication between an external object 401 and an internal, single-threaded object 409 is illustrated. The external object 401 first communicates 402 with a boundary object 403. This communication 402 is generally in the form of an invocation or a request to invoke one or more of the tasks associated with the concurrency domain (not shown). While the requested task is actually a task of the single-threaded object 409, the external object 401 only associates the task with the concurrency domain or the boundary object 403.

The boundary object 403 then communicates 404 with a work queue 405. This communication 404 generally includes posting a work item (not shown) to the work queue 405. The work queue 405 then communicates 406 with a dispatcher 407. This communication 406 generally includes the dispatcher 407 sequentially dispatching each work item posted on the work queue 405. Finally, the dispatcher 407 communicates 408 with the internal, single-threaded object 409 whose task is being invoked. This communication 408 generally includes the invocation of the task of the internal, single-threaded object 409. In another embodiment, the external object 401 is communicating with another boundary object (not shown) of the concurrency domain.

The asynchronous communication across concurrency domain boundaries, described above with reference to FIGS. 2-4, protects internal, single-threaded objects from reentrancy problems described above in the Background section. As will be appreciated, internally controlled reentrancy results when an object under the control of the top-level logic of the concurrency domain (e.g., an internal, single-threaded object or a boundary object) directs the internal thread to reenter another object also under the control of the top-level logic. Externally controlled reentrancy results when an object not under the control of the top-level logic of the concurrency domain (e.g., an external object) directs the internal thread to reenter an object under the control of the top-level logic.

Internally caused reentrancy results when an internal object reenters itself or another object in the same concurrency domain. Externally caused reentrancy results when events caused by external objects influence reentrancy, effectively removing control over reentrancy from the logic embodied collectively in the internal objects of a concurrency domain. The result is non-deterministic reentrancy.

Referring back to FIG. 3, allowing only asynchronous communications across the boundaries of a concurrency domain 301 protects internal, single-threaded objects 303 from externally controlled reentrancy. For example, if the execution of an internal, single-threaded object 303 includes an invocation of a task of an external object 310, then the internal thread 302 will enter one of the boundary objects 307 associated with the concurrency domain 301 and will invoke the task responsible for requesting the execution of tasks of external objects 310. The internal thread 302 will then return to executing the task of the internal, single-threaded object 303 or to executing dispatched work items 311 from the work queue 308. Because the internal thread 302 does not leave the concurrency domain 301 to enter the external object 310, it does not fall under the control of the external object 310.

Furthermore, if the internal thread 302 is allowed to execute the task of the external object 310 and if the execution of that task included an invocation of another task of the internal, single-threaded object 303, the internal thread 302 would not be allowed to reenter the concurrency domain 301. Rather, the internal thread 302 would enter a boundary object 307 of the concurrency domain 301 to invoke the task responsible for posting work items 311. Alternatively, as described above, under certain constraints, boundary objects may call out to external objects on an internal thread for invocation of task. After invocation of the task, the internal thread 302 would return to executing the task of the external object 310 and subsequently return to executing the first, original task of the internal, single-threaded object 303. In other words, the internal thread 302 would not execute the invocation of the second task by the external object 310 until execution of the first task is complete and until directed to do so by the dispatcher 309 of the concurrency domain 301.

Figure 5:
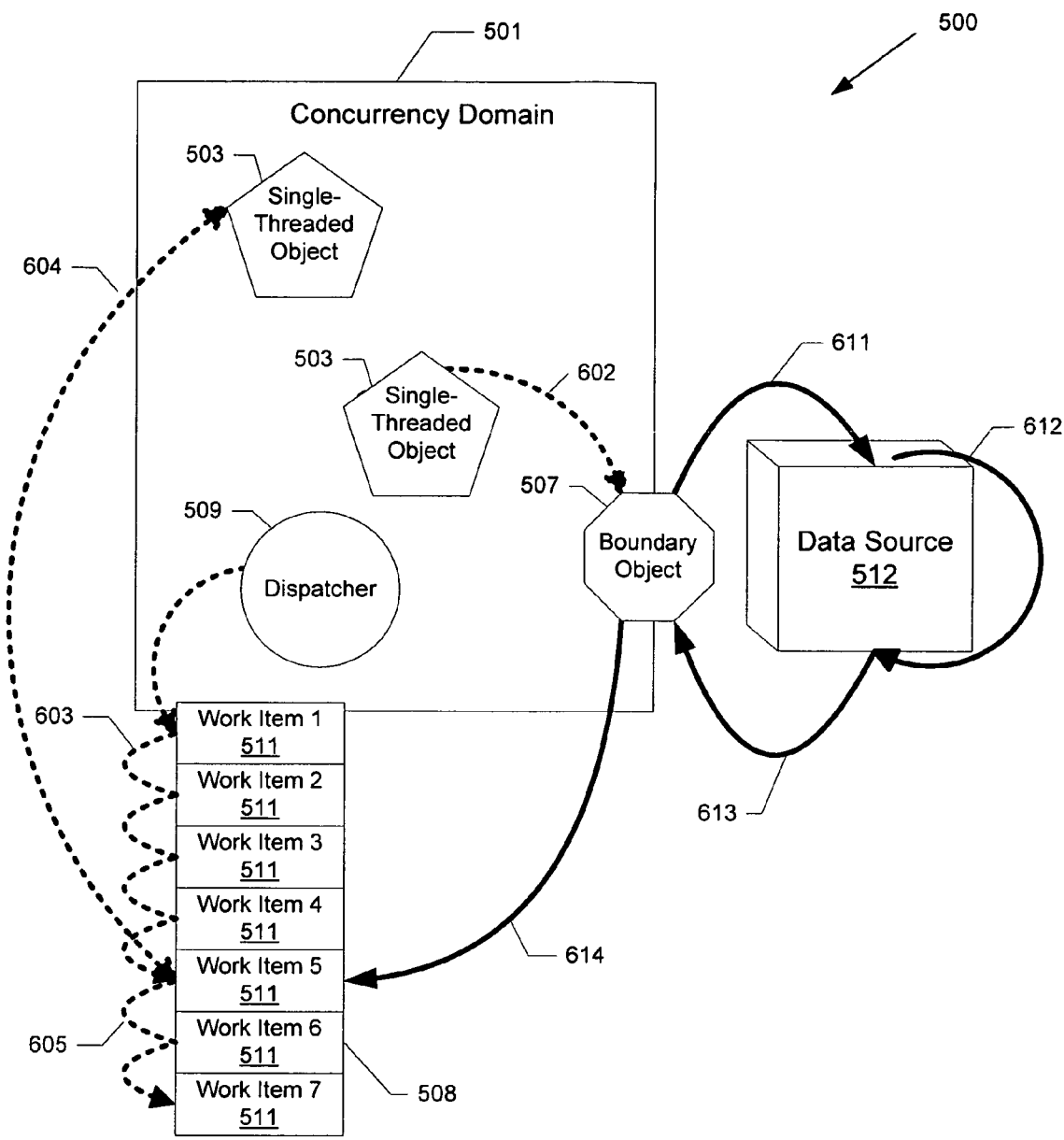
FIG. 5 illustrates an example path of execution when a concurrency domain interfaces with a database.
Figure 6:
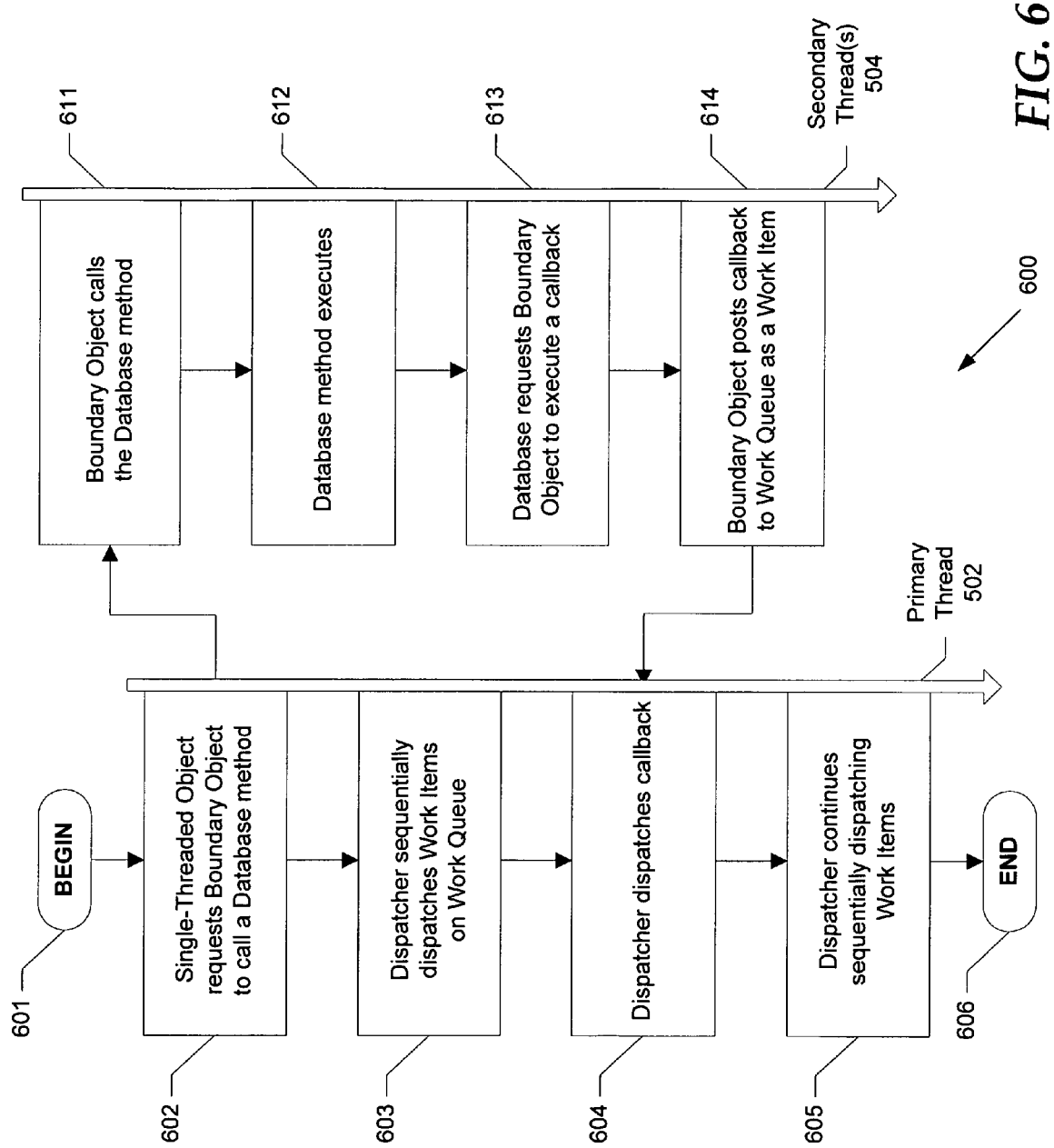
FIG. 6 illustrates an operational flow chart in which a first concurrency domain interfaces with a database.

Referring now to FIGS. 5 and 6, embodiments of the present invention in terms of an example external object that includes a data source are described. FIG. 5 illustrates a system 500 including a concurrency domain 501 and a data source 512, and FIG. 6 illustrates an operational flow chart 600 depicting the interface between an internal thread 502 of the concurrency domain 501 and a secondary thread 504 of the data source 512. In one embodiment, the secondary thread 504 includes multiple secondary threads 504. The concurrency domain 501 includes a single-threaded object 503 and a dispatcher 509 and is associated with a boundary object 507. The concurrency domain 501 maintains a work queue 508 representing pending tasks to be executed on the internal thread 502 of the concurrency domain 501. In one embodiment, the data source 512 is a database. In another embodiment, the data source 512 is a network.

The paths of execution of the internal thread 502 and the secondary thread 504 are shown in both figures. In FIG. 5, the dashed arrows depict the execution of a task occurring on the internal thread 502, and the solid arrows depict the execution of a task occurring on one or more of the secondary threads 504. The numbers referring to the dashed and solid arrows correspond to the operation or task being performed with respect to FIG. 6, which illustrates each task arranged along the thread on which it is executed.

Referring still to FIGS. 5 and 6, the method begins at start block 601 and proceeds to operation 602 in which the single-threaded object 503 requests the boundary object 507 to invoke a task associated with the data source 512. This request is executed on the internal thread 502 of the concurrency domain 501. In operation 603, the dispatcher 509 sequences through the work queue 508 and dispatches each work item 511. According to one embodiment, the work items 511 are dispatched, using the internal thread 502, in the order they were posted to the work queue 508. For example, the dispatcher 509 begins sequencing with work item 1 and ends sequencing with work item 7, assuming that no new work items 511 are added in the interim. Any new work items 511 would be added after work item 7. According to another embodiment, the work items 511 are dispatched according to an assigned priority value.

Method 602 also leads to method 611, which is executed simultaneously with operation 602. In method 611, the boundary object 507 invokes a task associated with the data source 512. The invocation is performed on one of the secondary threads 504. Next, the method proceeds to operation 612 in which the task of the data source 512 is executed on one or more of the secondary threads 504. Next, operation 613 includes the database 512 transmitting the result of the execution back to the boundary object 507 as a callback. The transmission of the result occurs on one or more of the secondary threads 504. Then, in operation 614, the boundary object 507 posts the callback to the work queue 508 as a work item 511. The post is executed on one or more of the secondary threads 504.

From operation 614, the method proceeds to operation 604. Operation 603 also leads into operation 604. Operation 604 occurs when the dispatcher 509, which was sequentially executing the work items 511 in the work queue 508 in operation 603, reaches the callback work item 511 added by the boundary object 507 in operation 614. The dispatcher 509 dispatches the callback using the internal thread 502. Once the callback has been dispatched, the dispatcher 509 continues to sequentially dispatch each work item 511 in the work queue 508 in operation 605. The method ends at 606.

Figure 7:
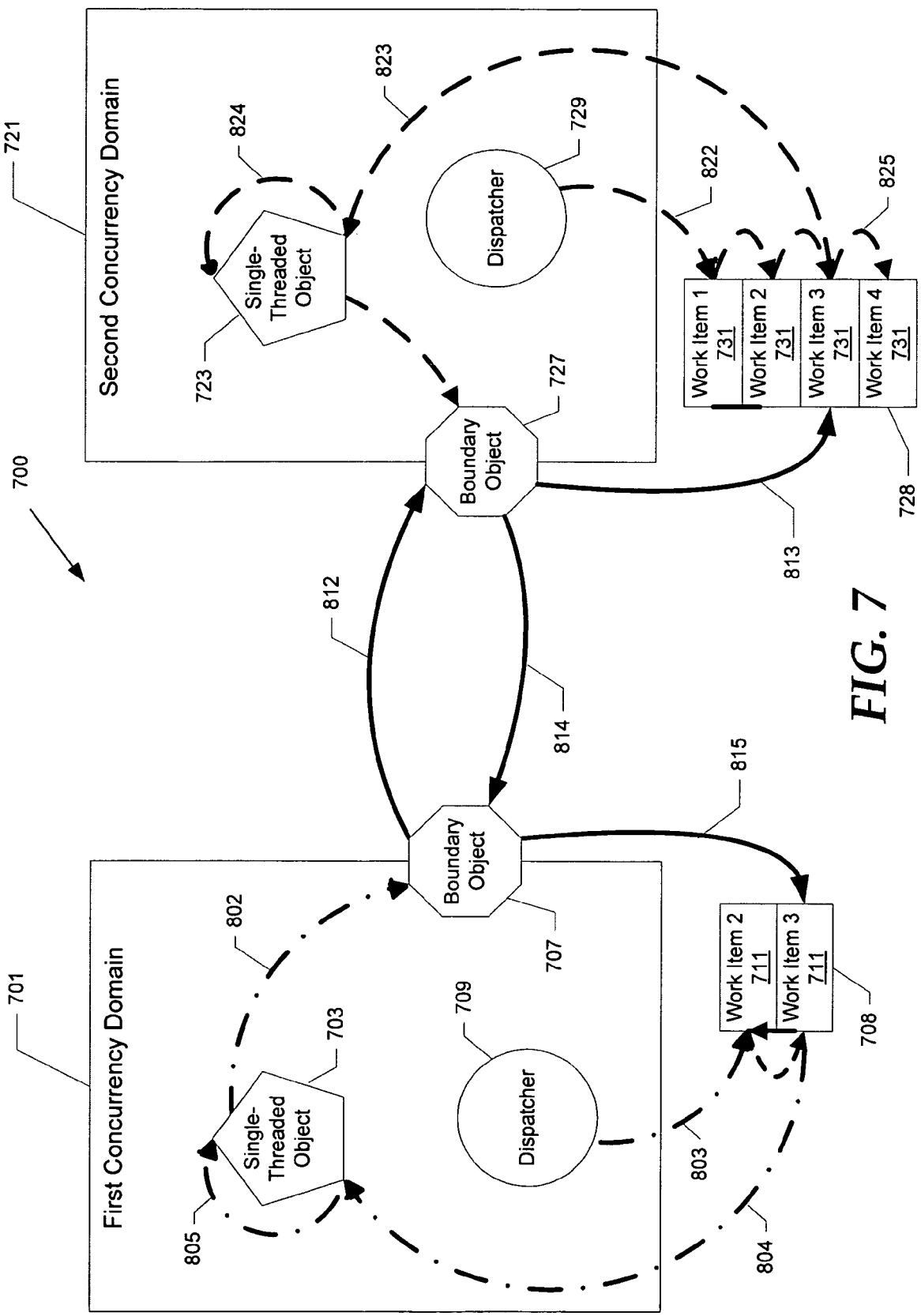
FIG. 7 illustrates an example path of execution when a first concurrency domain interfaces with a second concurrency domain.
Figure 8:
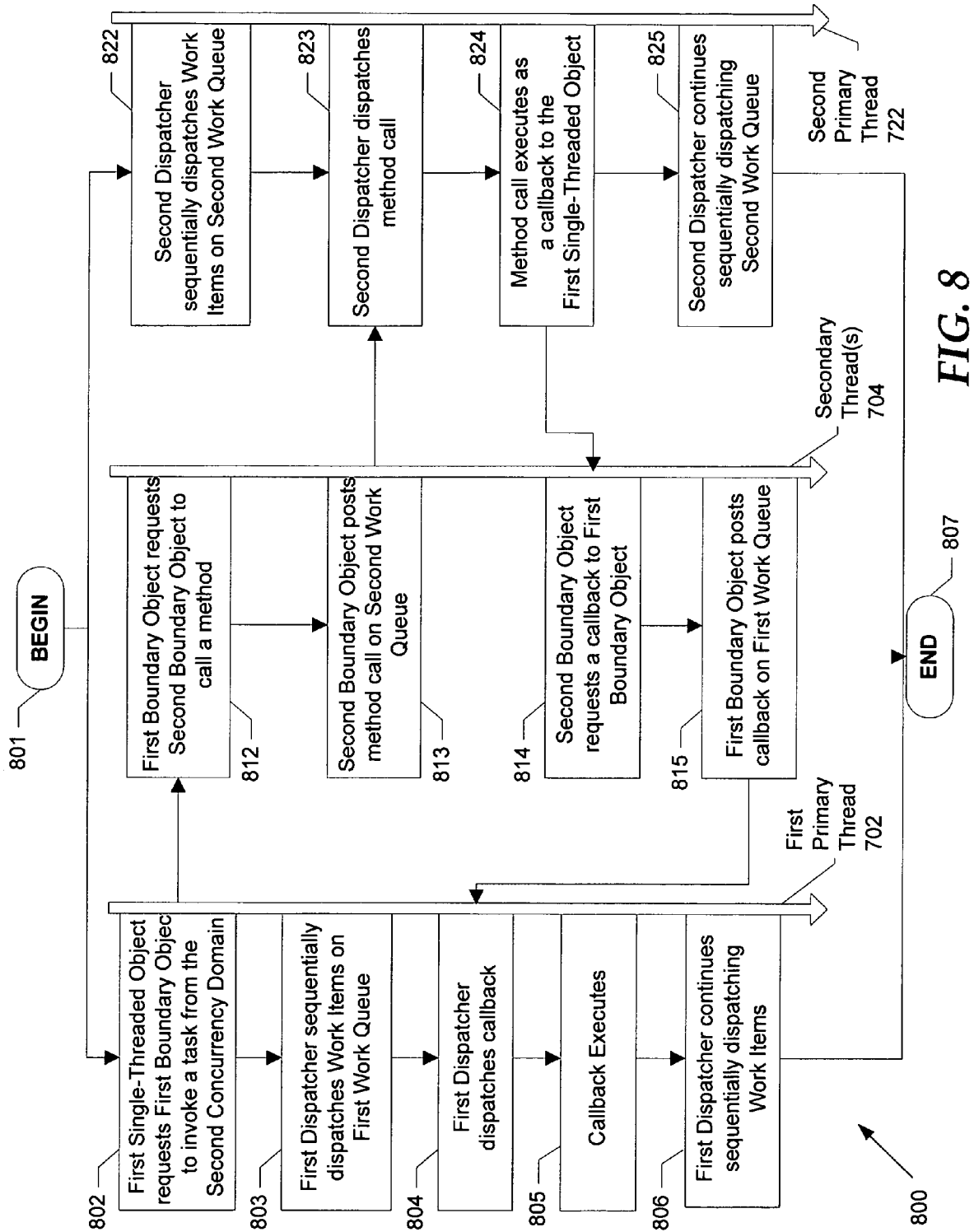
FIG. 8 illustrates an operational flow chart in which a first concurrency domain interfaces with a second concurrency domain.

Referring now to FIGS. 7 and 8, embodiments of the present invention in terms of an example external object that includes a second concurrency domain are described. FIG. 7 illustrates a system 700 including a first and second concurrency domain 701, 721 respectively, and FIG. 8 illustrates an operational flow chart 800 in which the first concurrency domain 701 interfaces with the second concurrency domain 721. Each concurrency domain 701, 721 includes an internal thread 702, 722, a single-threaded object 703, 723, and a dispatcher 709, 729, respectively. Each concurrency domain 701, 721 is associated with a boundary object 707, 727 and maintains a work queue 708, 728 representing pending work items 711, 731 to be executed on the internal thread 702, 722, respectively. In FIG. 7, a first set of dashed arrows depicts the execution of tasks occurring on the internal thread 702, a set of solid arrows depicts the execution of tasks occurring on one or more of the secondary threads 704, and a second set of dashed arrows depicts the execution of tasks occurring on the second internal thread 722. These dashed and solid arrows are shown executing the various operations involved in communicating between the first concurrency domain 701 and the second concurrency domain 721. The reference numbers referring to these arrows correspond with the operation or task being performed with respect to FIG. 8.

Referring still to FIGS. 7 and 8, the method begins at start block 801 and proceeds to both operations 802 and 822. Operation 822 includes the dispatcher 729 of the second concurrency domain 721 using the internal thread 722 to sequentially dispatch each work item 731 on the work queue 728. Operation 802 is performed concurrently with operation 822. In operation 802, the single-threaded object 703 of the first concurrency domain 701 requests the boundary object 707 to invoke a task from one of the objects of the second concurrency domain 721. In one embodiment, the requested task is a task of one of the single-threaded objects 723 of the second concurrency domain 721. In another embodiment, the requested task is a task of one of the boundary objects 727 associated with the second concurrency domain 721.

From operation 802, the method proceeds to both operations 803 and 812. In operation 803, the dispatcher 709 of the first concurrency domain 701 sequentially dispatches each work item 711 on the work queue 708. In operation 812, the boundary object 707 of the first concurrency domain 701 uses one or more of the secondary threads 704 to communicate with the boundary object 727 of the second concurrency domain 721. The communication includes the request to invoke the task. Then, in operation 813 the second boundary object 727 posts the requested task to the work queue 728 as a work item 731. The post is executed using one or more of the secondary threads 704.

Both operations 813 and operations 822 lead to operation 823. In operation 823, the dispatcher 729 reaches and dispatches the work item 731 including the requested task. The dispatch is executed on the internal thread 722 of the second concurrency domain 721. Then, the task is executed as a callback to the single-threaded object 703 in the first concurrency domain 701 in operation 824. At this point, the method again splits, proceeding to both operations 825 and 814. In operation 825, the dispatcher 729 continues to sequentially dispatch each work item 731 on the work queue 728.

Operation 814 occurs concurrently with operation 825. In operation 814, the boundary object 727 of the second concurrency domain 721 uses one or more secondary threads 704 to request the boundary object 707 of the first concurrency domain 701 to post the callback to the work queue 708 as a work item 711. Next, in operation 815, the boundary object 707 posts the call back to the work queue 708. The post is executed on one or more of the secondary threads 704.

Operation 804 occurs when the dispatcher 709 of the first concurrency domain 701 reaches the callback posted on the work queue 708. The dispatcher 709 uses the internal thread 702 of the first concurrency domain 701 to dispatch the callback. The callback executes in operation 805. Next, the method proceeds to operation 806 in which the dispatcher 709 continues to sequence through the work queue 708, dispatching each work item 711 in order. The method ends at 806.

Another example of a system (not shown) includes three or more concurrency domains interfacing with each other and with other external objects. Such a system would function substantially according to the same operations as described herein. Each concurrency domain in the system would include an internal thread, one or more single-threaded objects, and a dispatcher. Each concurrency domain would be associated with at least one boundary object and would maintain a work queue. All communications across the boundaries of the concurrency domains would be asynchronous (e.g., filtered through the respective boundary objects, work queues, and dispatchers).

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A system for synchronizing operations of components of a software application, comprising:
 a memory; and
 a processor, coupled to the memory, configured to process items associated with the software application including:
  a first concurrency domain that is a partition of user interface components of the software application and is for providing synchronization and thread isolation for the partitioned components, wherein the first concurrency domain includes a single internal processing thread operative to execute a single-threaded object of the software application;
  a first boundary object associated with the first concurrency domain for facilitating asynchronous communications between the first concurrency domain and an external object, wherein the first boundary object is operative to:
   receive a first work item from a software application object external to the first concurrency domain,
   determine whether at least one previously posted work item in a work item queue comprises a related task to the first work item,
   in response to determining that the at least one previously posted work item in a work item queue comprises a related task to the first work item, bundle the first work item with the previously posted work item in the work item queue, and
   in response to determining that the at least one previously posted work item in a work item queue does not comprise a related task, post the first work item to the work item queue, the first work item being directed to the single-threaded object;
  a first thread dispatcher object included in the concurrency domain operative to retrieve the posted first work item from the work item queue and to pass the posted first work item to the single-threaded object for processing by the single-threaded object; and
  the single-threaded object being operative to process the posted first work item and to return a result to the external object via the first boundary object such that when the first work item is to be processed in the first concurrency domain is determined by the first thread dispatcher object.

2. The system of claim 1, whereby the first thread dispatcher object is further operative to withhold from the single-threaded object a posted second work item directed to the single-threaded object until the single-threaded object returns a result from a processing of the posted first work item to the external object via the first boundary object.

3. The system of claim 2, wherein the external object comprises a secondary concurrency domain, the secondary concurrency domain being created by the first concurrency domain serving as parent domain to perform tasks for the software application and to publish results to another concurrency domain,
 including a single internal thread configured for execution of at least one other single-threaded object included in the secondary concurrency domain, and
 being associated with a secondary concurrency domain boundary object operative to receive the result from the single-threaded object via the first boundary object for processing by the single-threaded object included in the secondary concurrency domain.

4. A method for synchronizing operations of components of a software application, comprising:

receiving first a work item for processing by a first software application component instantiated in a main concurrency domain that is a partition of user interface components of the software application and is for providing synchronization and thread isolation for the partitioned components, wherein an additional concurrency domain is created by the main concurrency domain to perform tasks for the software application and to publish results to the main concurrency domain;

determining whether at least one previously posted work item in a work item queue comprises a related task to the first work item;

in response to determining that the at least one previously posted work item in a work item queue comprises a related task to the first work item, bundle the first work item with the previously posted work item in the work item queue;

in response to determining that the at least one previously posted work item in a work item queue does not comprise a related task, posting the work item in the work item queue by a boundary object of the of the main concurrency domain comprising one of: a data connector and an object for facilitating asynchronous communications between concurrency domains;

determining whether the first software application component has finished processing any previous work items passed to the first software application component for processing;

if the first software application component has finished processing any previous work items passed to the first software application component for processing, retrieving the work item posted to the work item queue by a dispatcher object; and passing the retrieved work item to the first software application component for processing such that internal and external reentrancy problems are prevented.

5. The method of claim 4, prior to receiving a work item for processing by the first software application component, instantiating the first software application component in the main concurrency domain separate from other components of the software application including a single internal processing thread operative to execute the first software application component.

6. The method of claim 5,
wherein receiving a work item for processing by a first software application component includes receiving the work item at the boundary object associated with the main concurrency domain from an object of the software application that is external to the main concurrency domain, the work item being directed to the first software application component.

7. The method of claim 6, wherein determining whether the first software application component has finished processing any previous work items passed to the first software application component for processing includes determining whether the dispatcher object provided in the main concurrency domain has been notified that results from any previous work items passed to the first software application component have been passed from the first software application component to the boundary object.

8. The method of claim 7, wherein passing the retrieved work item to the first software application component for processing includes causing the dispatcher object to pass the retrieved work item to the software application component for processing in response to being notified that results from any previous work items passed to the first software application component have been passed from the first software application component to the boundary object.

9. The method of claim 8, further comprising causing the dispatcher object to withhold from the first software application component a posted second work item directed to the first software application component until the first software application component returns a result from a processing of the retrieved work item to the first software application component via the boundary object.

10. The method of claim 9, wherein causing the dispatcher object to withhold from the first software application component a posted second work item directed to the first software application component includes preventing the first software component from requesting the posted second work item such that the first software application component may only receive the posted second work item for processing when the dispatcher object determines that the first software application component is ready to process the posted second work item.

11. The method of claim 9, wherein receiving the work item at a boundary object associated with the concurrency domain from an object of the software application that is external to the concurrency domain includes receiving the work item at the boundary object from the additional concurrency domain, the additional concurrency domain including a single internal thread configured for execution of second software application component included in the additional concurrency domain, and the additional concurrency domain being associated with a second boundary object operative to receive the result from the first software application component via the boundary object.

12. A computer readable storage medium containing computer executable instructions which when executed by a computer perform a method of concurrently executing single-threaded and multithreaded objects, comprising:

receiving a software application containing a plurality of software components operative for processing data concurrently;

separating each of the software components operative for processing data concurrently into separate concurrency domains, wherein a main concurrency domain is associated with user interface components of the software application, and a secondary concurrency domain is created by the main concurrency domain to perform tasks for the software application and to publish results to the main concurrency domain;

associating a boundary object with each separate concurrency domain for receiving any data calls directed to software component objects contained in the separate concurrency domains, wherein the boundary object is operative to:

receive a first work item from a software application object external to the first concurrency domain, determine whether at least one previously posted work item in a work item queue associated with the boundary object comprises a related task to the first work item, in response to determining that the at least one previously posted work item in a work item queue comprises a related task to the first work item, bundle the first work item with the previously posted work item in the work item queue, and in response to determining that the at least one previously posted work item in a work item queue does not comprise a related task, post the first work item to the work item queue, the first work item being directed to the single-threaded object; and disposing a dispatcher object in each of the separate concurrency domains for presenting data calls to individual software component objects after the individual software component objects have completed processing of other data calls previously presented to the individual software component objects such that internal and external reentrancy problems are prevented.

13. The computer storage readable medium of claim 12, further comprising:

in the main concurrency domain, executing a single-threaded object in response to a data call received from the dispatcher object using a single processing thread internal to the main concurrency domain, the single processing thread executing without direct calls from any secondary threads external of the main concurrency domain; and executing an external object that is not included in the main concurrency domain using a secondary processing thread, the secondary processing thread executing without direct calls from the single processing thread in the main concurrency domain.

14. The computer readable storage medium of claim 13, further comprising interfacing between the single processing thread internal to the main concurrency domain internal thread and the secondary processing thread using a boundary object associated with the main concurrency domain.

15. The computer readable storage medium of claim 14, wherein the secondary processing thread includes a second single processing thread internal to the secondary concurrency domain, where the second single processing thread is configured to execute single-threaded objects contained in the secondary concurrency domain, the secondary concurrency domain having an associated boundary object for interfacing with the boundary object associated with the main concurrency domain.

16. The computer readable storage medium of claim 15, wherein work items are deposited in the work queue associated with each boundary object until retrieved by an associated dispatcher object for presentation to a given individual software component object.

17. The computer readable storage medium of claim 16, further comprising receiving a data call at the boundary object associated with the main concurrency domain from the secondary concurrency domain for execution by a given software component object contained in the main concurrency domain via the boundary object associated with the secondary concurrency domain.

18. The computer readable storage medium of claim 17, further comprising depositing the data call from the secondary concurrency domain in a work queue associated with the main concurrency domain.

19. The computer readable storage medium of claim 18, wherein if the given software component object contained in the main concurrency domain has completed processing any previously received data calls, causing a dispatcher object associated with the main concurrency domain to retrieve the data call from the secondary concurrency domain from the work queue associated with the main concurrency domain, and causing the dispatcher object associated with the main concurrency domain to present the data call from the secondary concurrency domain to the given software component object contained in the main concurrency domain for processing.

20. A method for synchronizing operations of components of a software application, comprising:

instantiating a first software application component in a main concurrency domain separate from other components of the software application including a single internal processing thread operative to execute the first software application component;

creating, by the main concurrency domain, an additional concurrency domain is to perform tasks for the software application and to publish results to the main concurrency domain;

receiving a first work item for processing by the first software application component at a boundary object associated with the main concurrency domain from an external object;

determining, at the boundary object, whether at least one previously posted work item in a work item queue associated with the boundary object comprises a related task to the first work item;

in response to determining that the at least one previously posted work item in a work item queue comprises a related task to the first work item, bundle the first work item with the previously posted work item in the work item queue;

in response to determining that the at least one previously posted work item in a work item queue does not comprise a related task, posting the work item in the work item queue by a boundary object of the of the main concurrency domain comprising one of: a data connector and an object for facilitating asynchronous communications between concurrency domains;

determining whether the first software application component has finished processing any previous work items passed to the first software application component for processing, wherein determining whether the first software application component has finished processing any previous work items passed to the first software application component for processing includes determining whether a dispatcher object provided in the main concurrency domain has been notified that results from any previous work items passed to the first software application component have been passed from the first software application component to the boundary object;

if the first software application component has finished processing any previous work items passed to the first software application component for processing, retrieving the work item posted to the work item queue by the dispatcher object;

passing the retrieved work item to the first software application component for processing such that internal and external reentrancy problems are prevented, wherein passing the retrieved work item to the first software application component for processing comprises causing the dispatcher object to pass the retrieved work item to the software application component for processing in response to being notified that results from any previous work items passed to the first software application component have been passed from the first software application component to the boundary object; and causing the dispatcher object to withhold from the first software application component a posted second work item directed to the first software application component until the first software application component returns a result from a processing of the retrieved work item to the first software application via the boundary object.

* * * * *